US008924613B2

(12) United States Patent (10) Patent No.: US 8,924,613 B2
Yamamoto (45) Date of Patent: Dec. 30, 2014

(54) DATA PROCESSING DEVICE AND DATA PROCESSING METHOD

(71) Applicant: Panasonic Corporation, Osaka (JP)

(72) Inventor: Takashi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/158,619

(22) Filed: Jan. 17, 2014

(65) Prior Publication Data

US 2014/0136743 A1 May 15, 2014

Related U.S. Application Data

(63) Continuation of application No. PCT/JP2012/003418, filed on May 25, 2012.

(30) Foreign Application Priority Data

Jul. 22, 2011 (JP) ................................ 2011-161340

(51) Int. Cl.
*G06F 13/38* (2006.01)
*G06F 13/362* (2006.01)
*G06F 13/364* (2006.01)
*G06F 13/16* (2006.01)

(52) U.S. Cl.
CPC ............ *G06F 13/362* (2013.01); *G06F 13/364* (2013.01); *G06F 13/16* (2013.01)
USPC .......................................... 710/240; 710/309

(58) Field of Classification Search
USPC .......................... 710/104–119, 240–244, 309
See application file for complete search history.

(56) References Cited

U.S. PATENT DOCUMENTS

| 6,412,030 | B1 | 6/2002 | Adusumilli |
| 6,920,512 | B2* | 7/2005 | Steinman et al. ............. 710/100 |
| 7,080,194 | B1* | 7/2006 | Van Dyke ...................... 711/105 |
| 7,272,692 | B2* | 9/2007 | Barnum et al. ............... 711/158 |
| 7,673,095 | B2* | 3/2010 | Artieri ......................... 711/109 |
| 8,699,277 | B2* | 4/2014 | Terzioglu et al. ......... 365/189.04 |
| 2006/0174081 | A1* | 8/2006 | Latta ............................ 711/168 |
| 2010/0023694 | A1* | 1/2010 | Ozaki .......................... 711/119 |
| 2010/0174856 | A1* | 7/2010 | Diggs et al. .................. 711/103 |
| 2011/0016279 | A1* | 1/2011 | Gillingham .................. 711/154 |

FOREIGN PATENT DOCUMENTS

| JP | 02-128249 A | 5/1990 |
| JP | 2006-031124 A | 2/2006 |
| JP | 2007-026366 A | 2/2007 |
| JP | 2010-244408 A | 10/2010 |
| WO | 2009/147744 A1 | 12/2009 |

OTHER PUBLICATIONS

International Search Report issued in International Application No. PCT/JP2012/003418 Date of mailing Jul. 31, 2012, with English Translation.

* cited by examiner

*Primary Examiner* — Raymond Phan
(74) *Attorney, Agent, or Firm* — McDermott Will & Emery LLP

(57) ABSTRACT

A data processing device includes a master arbitrating unit assigning information to a command sent from a selected bus master, a data buffer, a write command buffer, a read command buffer, a write data reception completion notification control unit issuing a signal indicating that storing of write data is complete, and a command order determining unit selecting whichever of a first command and a second command coming earlier in an order identified with the information, the first information being information for which the completion is indicated by the signal and a second command being a read command.

8 Claims, 9 Drawing Sheets

FIG. 3A

DATA PROCESSING DEVICE AND DATA PROCESSING METHOD

CROSS REFERENCE TO RELATED APPLICATIONS

This is a continuation application of PCT International Application No. PCT/JP2012/003418 filed on May 25, 2012, designating the United States of America, which is based on and claims priority of Japanese Patent Application No. 2011-161340 filed on Jul. 22, 2011. The entire disclosures of the above-identified applications, including the specifications, drawings and claims are incorporated herein by reference in their entirety.

FIELD

The present disclosure relates to a data processing device which is connected to multiple bus masters and a memory device and controls data transmission between the bus masters and the memory device.

BACKGROUND

A data processing device using a memory device such as a Synchronous Dynamic Random Memory (SDRAM) includes a memory access control circuit for controlling data transmission to the memory device. Based on the control by the memory access control circuit, the data processing device transmits data to the memory.

FIG. 6 is a data processing device 400 implemented with a conventional technique.

As shown in FIG. 6, each of bus masters 402 transmits data to a memory device 450 as described below.

Typical commands include a write command and a read command. A master arbitrating unit 410 receives commands from the bus masters 402. The master arbitrating unit 410 selects the commands in a predetermined order when simultaneously receiving multiple commands, and writes, in the order of the selection, the commands in command buffers (a read command buffer 430 and a write command buffer 431) included in a memory control unit 401. When a write command and write data are written in the write command buffer 431 and the data buffer 432, respectively, the command selecting unit 420 issues a write command to an access control unit 440. When the write command is issued from the command selecting unit 420, the access control unit 440 accesses the address of the memory device 450 indicated in the write command. In other words, when the access is made to the memory device 450 with a write command, the write command cannot be issued to the access control unit 440 until the write data of the write command is stored in the data buffer 432.

The data processing device 400 in FIG. 6 separately includes a read command buffer 430 and a write command buffer 431. The command selecting unit 420 selects a command from among write commands and read commands.

Using various techniques, the command selecting unit 420 selects a command from among the write commands in the write command buffer 431 and the read commands in the read command buffer 430.

Patent Literature 1 discloses a technique which compares an address indicated in a write command and another address indicated in a read command, and causes one of the commands to overtake the other.

CITATION LIST

Patent Literature

Japanese Unexamined Patent Application Publication No. 02-128249

SUMMARY

Technical Problem

Described hereinafter are problems of each of selecting techniques employed by the command selecting unit 420.

(i) There is a problem in a selecting technique which is utilized by the command selecting unit 420 for selecting a command as a master arbitrating unit 410 selects the command.

In other words, when the command selecting unit 420 selects a write command, the write command cannot be issued to the access control unit 440 unless write data is stored in the data buffer 432. Consequently, the time for issuing the write command by the command selecting unit 420 is delayed until the time for storing the write data, which results in overhead.

In contrast, there are techniques which are used by the command selecting unit 420 to select either a write command or a read command, regardless of information indicating which command the master arbitrating unit 410 has selected. Such techniques include fixed-priority processing and round-robin processing.

(ii) There is another problem in a selecting technique in a fixed-priority fashion which prioritizes a write command.

Considered is a case where the master arbitrating unit 410 selects multiple write commands after a read command. Here, in the command selecting unit 420, the read command could be continuously overtaken by the following multiple write commands. This would significantly mix up an order that the master arbitrating unit 410 selects.

FIG. 7 shows an example that how the command selecting unit 420 mix up an order of commands selected by the master arbitrating unit 410.

A field 700 chronologically shows commands selected by the master arbitrating unit 410. The master arbitrating unit 410 selects one of the bus masters 402.

A field 701 chronologically shows a state the read command buffer 430. The read command buffer 430 stores zero or more read commands.

A field 702 chronologically shows a state of the write command buffer 431. The write command buffer 431 stores zero or more write commands.

A field 703 chronologically shows commands to be issued by the command selecting unit 420 to the memory device 450.

The command R(5) is master-arbitrated at the time t4 (selected by the master arbitrating unit 410). However, the command R(5) is not issued to the access control unit 440 even at the time t11. The command R(5) is overtaken one after another by the following write commands. In other words, the command R(5) is issued after the following one or more write commands are issued. The example in FIG. 7 shows that the one or more of the following commands are the commands W(6) and W(7).

(iii) There is another problem in a selecting technique for select a write command and a read command in a round-robin fashion.

When the master arbitrating unit 410 executes processing, some of the write commands are continuously issued to the write command buffer 431. Then all write data items each corresponding to one of the write commands are stored in the data buffer 432. Considered is the case where a read command is issued to the read command buffer 430 after the storing of all the write data items is complete. Here, the read command would unilaterally overtake all the previously-issued write commands. Unfortunately, such overtaking could significantly alter the result of a selection made by the master arbitrating unit 410. The master arbitrating unit 410 selects what number command the read command is. The read command is issued earlier to the access control unit 440 for further overtaking. Consequently, the order of the commands would inevitably change.

One non-limiting and exemplary embodiment provides a data processing device which minimizes the mix-up of an order selected by a master arbitrating unit and, in order to hide overhead, allows a read command to overtake a write command which waits for write data and cannot be issued.

Solution to Problem

In order to solve the above problems, a data processing device according to an aspect of the present disclosure controls transmission of data from bus masters to a memory device. The data processing device includes: a master arbitrating unit which generates a command with additional information assigned, the master arbitrating unit selecting one of the bus masters, and the additional information being assigned to a command sent from the one selected bus master; a write command buffer which stores the write command in a case where the command with the additional information is the write command; a read command buffer which stores a read command in a case where the command with the additional information is the read command; a signal issuing unit which issues a signal which indicates that storing of the write data is complete; and a command order determining unit which selects one of a first command and a second command as a command to be issued to the memory device, the first command being the write command stored in the write command buffer and for which the issued signal indicates that the storing of the write data is complete, the second command being the read command stored in the read command buffer, and the command to be issued being whichever of the first command and the second command comes earlier in an order identified with the additional information assigned.

It is noted that the additional information is to identify a relatively appropriate order of the commands.

In other words, the additional information is either an ID (see the ID 9Nr in FIG. 3B and the ID 9Nw in FIG. 3C) indicating that a command is what number command selected by the master arbitrating unit or a remaining time degree (see the ID 9Jr in FIG. 5B and the ID 9Jw in FIG. 5C) for the time period spent for processing the command.

In other words, an ID having a smaller number may come earlier in the order. Furthermore, a remaining time degree having a relatively lower remaining time degree may come earlier in the order.

The remaining time degree is a period (time period) for an access by a command between the current time and a time when the access has to end. In the case where the access does not finish by the time when the access has to end, a problem will develop.

It is noted that the above time includes an estimated time.

In other words, the master arbitrating unit assigns additional information to a command when the selected bus master requests an access. Based on the additional information assigned to each of commands and information (the signal indicating that the storing of the write data is complete) indicating whether or not storing of write data in the data buffer is complete, the command order determining unit then selects one of the commands.

Such features minimize the mix-up of an order selected by the master attributing unit and allow a read command to overtake a write command, which waits for write data and cannot be issued, in order to hide overhead.

It is noted that the command order determining unit may execute determining an effective write command for identifying such a write command. The effective write command is one whose write data is available.

Advantageous Effects

The additional information assigned by the master arbitrating unit facilitates the selection between a write command and a read command, eliminating serious mix-up of the order selected by the master arbitrating unit. Such features make it possible to issue, to an access control unit, one of the write command and the read command selected not to cause a serious mix-up of the order. In the case where there is a write command waiting for write data, a read command can be selected. This contributes to issuing a command more appropriately to the access control unit, and hiding overhead of the memory device.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3A depicts a chart showing how commands are selected in Embodiment 1.

DESCRIPTION OF EMBODIMENTS

Described hereinafter are embodiments of the present disclosure with reference to the drawings. It is noted that any of the embodiments below is a specific example of the present disclosure. The numerical values, constituent elements, arrangement positions and connecting schemes of the constituent elements, steps, and an order of steps all described in the embodiments are examples, and shall not be defined as they are. The present disclosure shall be defined only by claims. Hence, among the constituent elements in the embodiments, those not described in an independent claim representing the most generic concept of the present disclosure are not necessarily required to achieve the objects of the present disclosure; however, such constituent elements are introduced to implement an optional form of the present disclosure.

A data processing device 100 (see drawings including FIG. 1) in the embodiments controls transmission of data from bus masters 102 to a memory device 150.

Figure 3A:
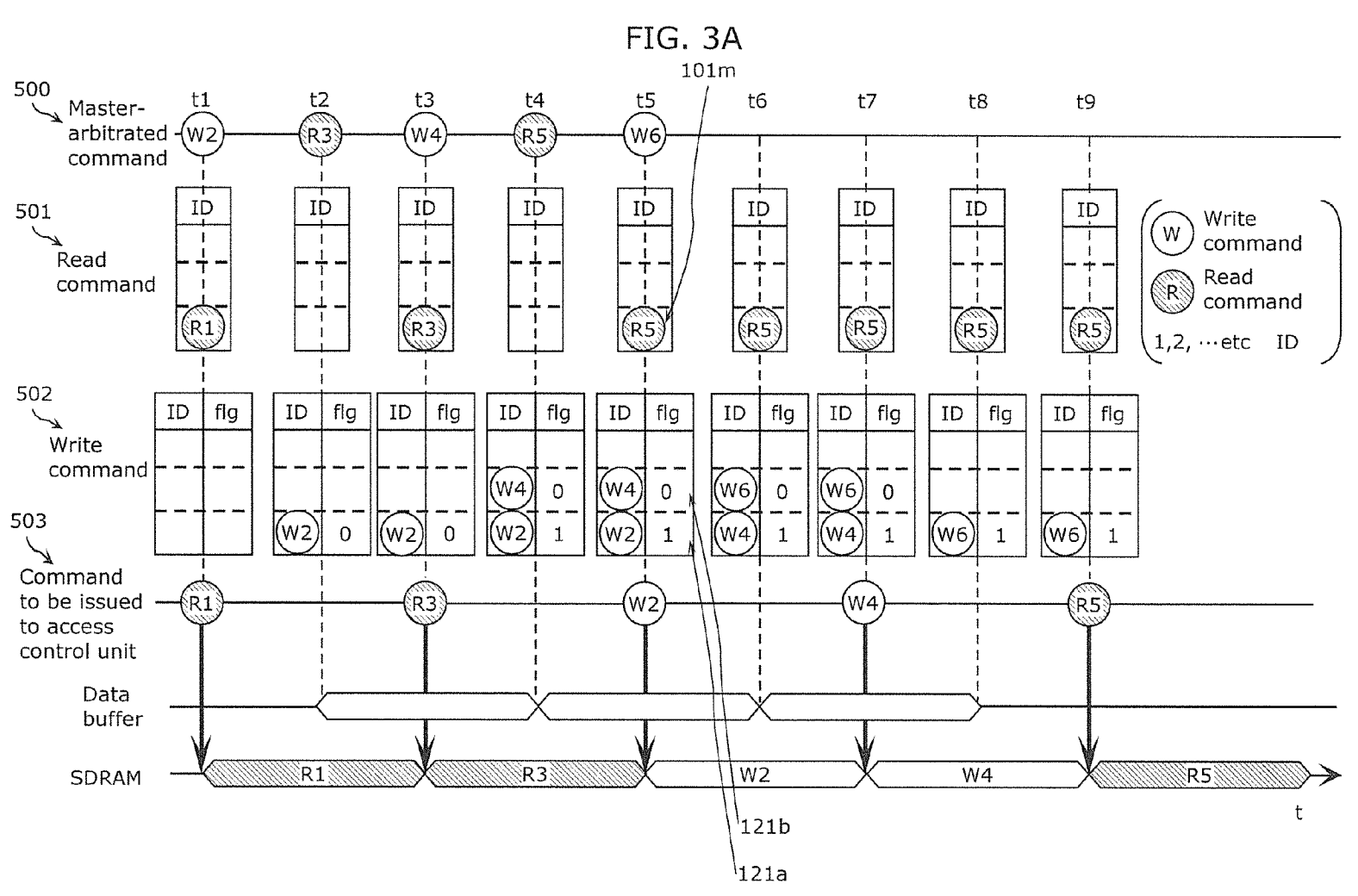
Figure 3B:
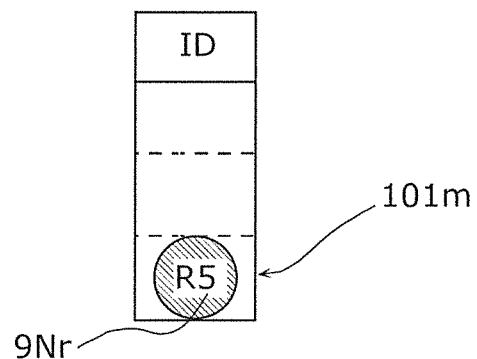
FIG. 3B shows a state of a read command having an ID and stored in a read command buffer.

The data processing device 100 includes a master arbitrating unit 110 which generates a command 101c (FIG. 1) with predetermined information 110i (see IDs 9Nr and 9Nw in FIGS. 3B and 3C, remaining time degrees 9Jr and 9Jw in FIGS. 5B and 5C) assigned. Here, the master arbitrating unit 110 selects one of the bus masters 102 (for example, the bus masters 102s) and the predetermined information 110i is assigned to a command 110c sent from the one selected bus master 102s. The data processing device 100 includes a data buffer 122 which stores write data (data 122d) of a write command 101w in the case where the command 101c is the write command 101w. The data processing device 100 includes a write command buffer 121 which stores the command 101c (the write command 101w) in the case where the command 101c is the write command 101w. The data processing device 100 includes a read command buffer 120 which stores the command 101c (a read command 101r) in the case where the generated command 101c is the read command 101r. The data processing device 100 includes a signal issuing unit (a write data reception completion notification control unit 130) which issues a signal (a signal which indicates information 130i) indicating that storing of the write data 122d in the data buffer 122 is complete. The data processing device 100 includes a command order determining unit 131 which selects one of the write command 101w (an example of the first command, such as a command 121a in FIGS. 3A and 3C) stored in the write command buffer 121 and the read command 101 (an example of the second command, such as a command 101m in FIGS. 3A and 3B) stored in the read command buffer 120. The command order determining unit 131 selects one of the commands currently stored in the command buffers. The selected command (for example, the command 121a) comes the earliest in the order identified with the information 110i. The command order determining unit 131 issues the selected command to the memory device 150. For further details of the information 110i assigned to the selected command, see the information 110i assigned to each of the first and second commands, the IDs 9Nr and 9Nw, and the remaining time degrees 9Jr and 9Jw.

In the embodiments, the information 110i may be an ID (such as the IDs 9Nr and 9Nw) indicating that an access request to the memory device 150 is what number access request selected by the master arbitrating unit 110. Here, the access request is made by the command to which the information 110i is assigned. The command order determining unit 131 may select one of the first command (the command 121a in FIG. 3A) and the second command (the command 101m in FIG. 3A) having an ID (such as the IDs 9Nr and 9Nw) with a smaller number (for example, the command 121a).

The information 110i may also be a remaining time degree (see the remaining time degrees 9Jr and 9Jw) for a processing time period spent for an access to the memory device 150 with the command 110c. After storing the command 101c that is the command 101w with a remaining time degree, the write command buffer 121 decrements the remaining time degree of the command 101c. After storing the command 101c that is the command 101r with a remaining time degree, the read command buffer 120 decrements the remaining time degree of the command 101c. Here, of the first command (the command 121a) and the second command (the command 101m), the command order determining unit 131 may select a command (for example, the command 121a) having a lower remaining time degree of the remaining time degrees (see the remaining time degrees 9Jr and 9Jw in FIGS. 5B and 5C) at the time of the selection.

Figure 1:
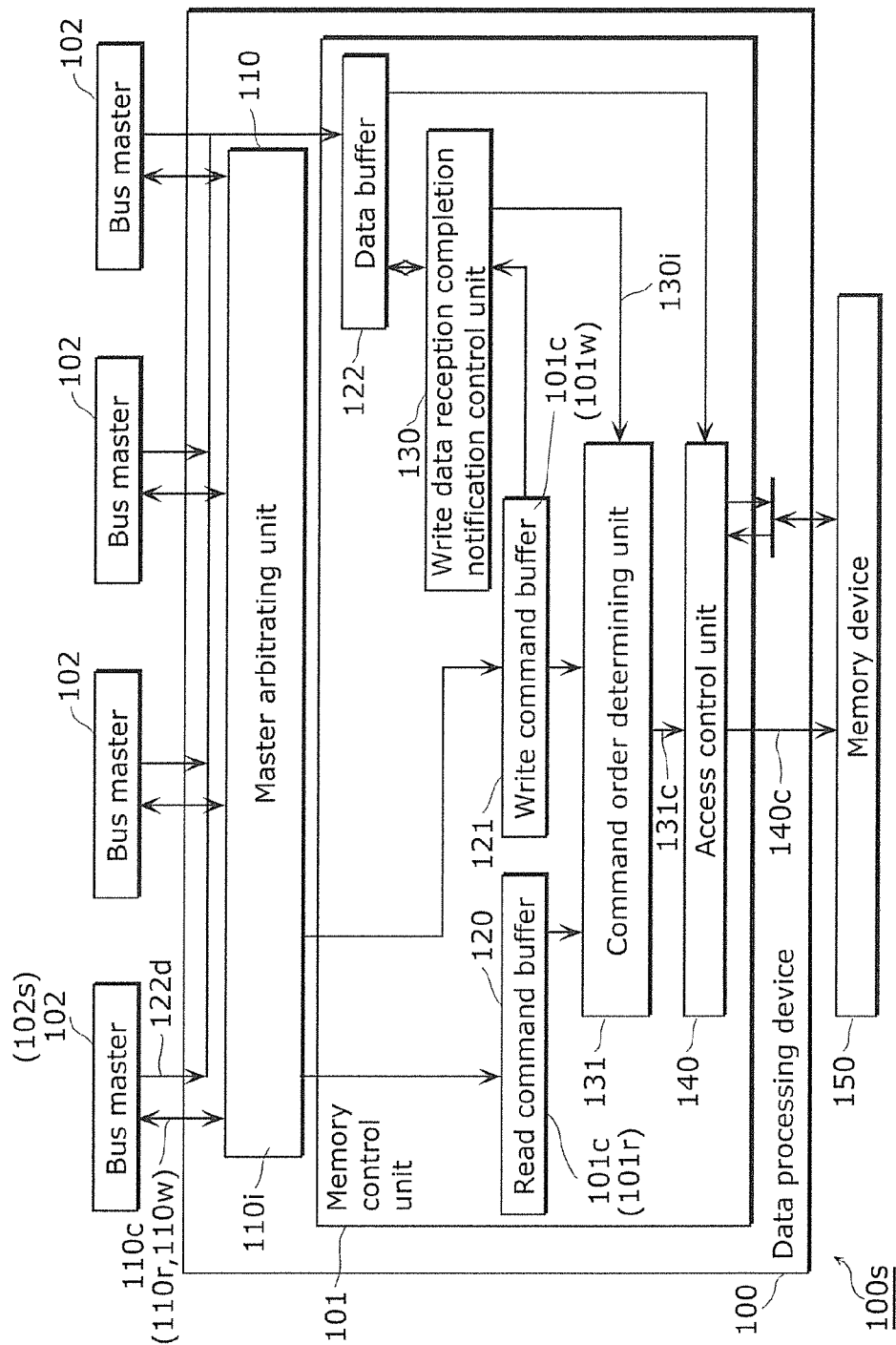
FIG. 1 depicts a block diagram of a data processing device according to Embodiments 1 and 2.

FIG. 1 shows a data processing device according to an embodiment of the present disclosure.

A data processing device 100 according to an embodiment of the present disclosure is connected to multiple bus masters 102 and a memory device 150. The data processing device 100 includes a master arbitrating unit 110 and a memory control unit 101.

The memory control unit 101 includes a read command buffer 120, a write command buffer 121, a data buffer 122, a write data reception completion notification control unit 130, a command order determining unit 131, and an access control unit 140. The data buffer 122 is shared by the multiple bus masters 102.

Embodiment 1

The structure illustrated in FIG. 1 shows that each of the bus masters 102 issues a read access request and a write access request to the master arbitrating unit 110.

When an access request is the write access request, one of the bus masters selected by the master arbitrating unit 110 (for example, a bus master 102s in FIG. 1) issues a write command (a command 110w) to the master arbitrating unit 110. As soon as issuing the write command, the selected bus master 102 issues, to the data buffer 122, write data (data 122d) to the write command.

In contrast, when the access request is the read access request, the one selected bus master 102 issues a read command (a command 110r) to the master arbitrating unit 110.

The master arbitrating unit 110 receives a command (a command 110c) from the selected bus master. The master arbitrating unit 110 then assigns an ID to the received command. The assigned ID is information indicating that the master arbitrating unit 110 selects what number access request for the command with the ID assigned. In other words, the ID is the information 110i indicating what number command is the selected command. It is noted that the assigned ID may indicate what number command in the order the selected command is. The assigned ID may also be a character string and a numeric character which correspond to the number.

In the case where the command with ID is a read command indicating a read access request, the master arbitrating unit 110 issues to the read command buffer 120 a command (a command 101r) with an ID assigned.

In contrast, in the case where the command with ID is a write command indicating a write access request, the master arbitrating unit 110 issues to the write command buffer 121a command (a command 101w) with an ID assigned.

The read command buffer 120 holds the read command issued by the master arbitrating unit 110, and issues the read command to the command order determining unit 131.

The write command buffer 121 holds the write command issued by the master arbitrating unit 110, and issues the write command to the command order determining unit 131.

The write data reception completion notification control unit 130 checks the state of the write command buffer 121. Specifically, the write data reception completion notification control unit 130 checks whether or not the write data (the data 122d) corresponding to the command (the command 110w) is stored in the data buffer 122. When the storing of the write data is complete, the write data reception completion notification control unit 130 issues, to the command order determining unit 131, an identifier (information 130i) which identifies the completion of the data storing.

The command order determining unit 131 selects either the read command to be issued by the read command buffer 120 or the write command to be issued by the write command buffer 121.

Specifically, in selecting a command, the command order determining unit 131 selects more appropriate one of the read command and the write command, based on the IDs each assigned to one of the read command and the write command and on the completion identifier (the information 130i) to be issued by the write data reception completion notification control unit 130.

In the case where a selected command is the read command, the command order determining unit 131 issues a read command to the access control unit 140. Upon issuing the read command, the access control unit 140 issues a read command to the memory device 150 and requests the transmission of read data.

In the case where a selected command is the write command, the command order determining unit 131 issues a write command to the access control unit 140. Upon receiving the write command, the access control unit 140 receives the write data (the data 122d) from the data buffer 122. When receiving the write data, the access control unit 140 issues a write command to the memory device 150, and causes the memory device 150 to transmit the received write data.

Figure 2:
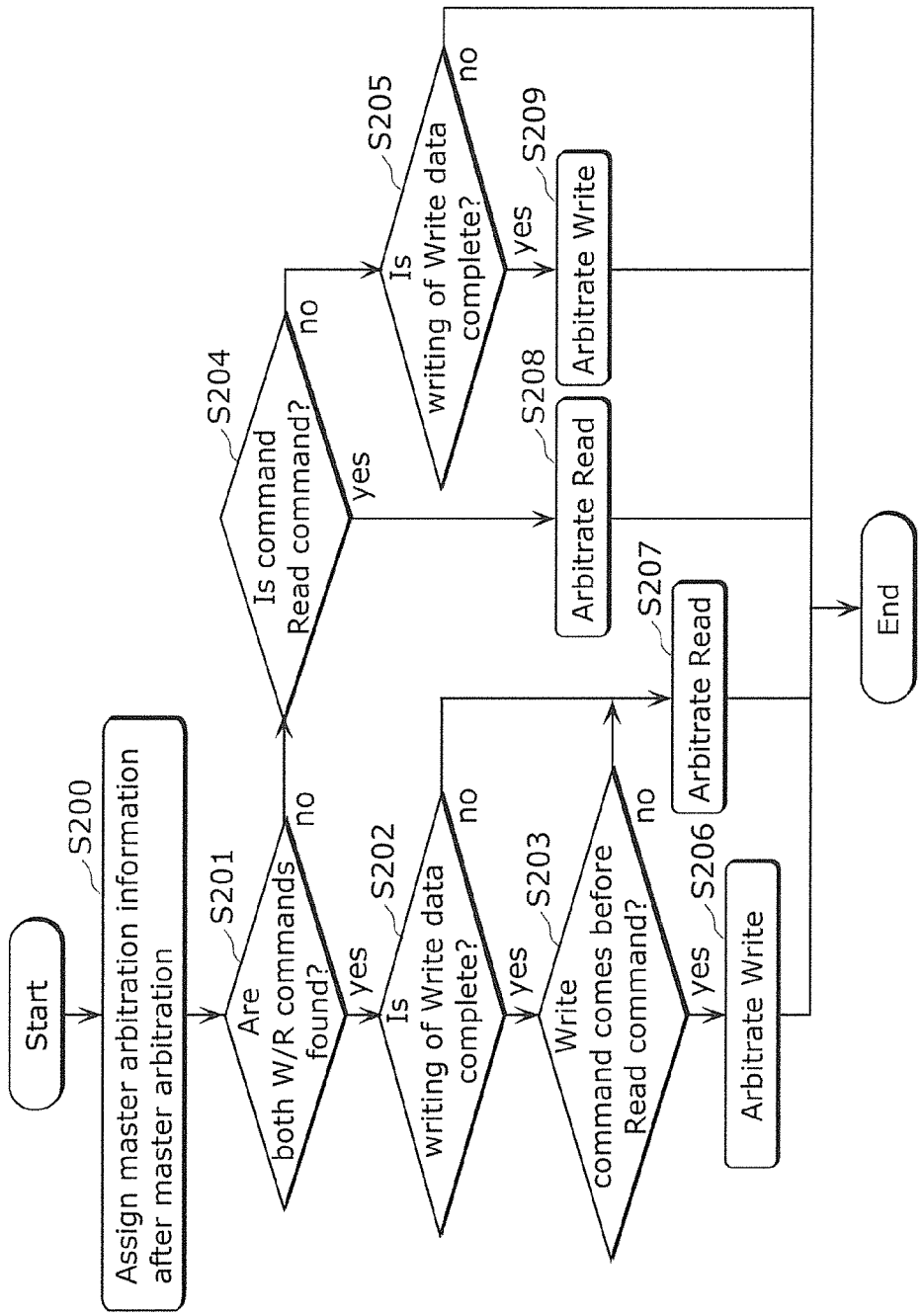
FIG. 2 is depicts a flowchart showing operations in Embodiment 1.

FIG. 2 depicts a flow of processing executed by the data processing device 100 in FIG. 1.

In Step S200, the master arbitrating unit 110 selects one of the access requests issued by the multiple bus masters 102. The master arbitrating unit 110 receives a command (the command 110c) which makes the received access request and is issued by one of the bus masters 102. The master arbitrating unit 110 then assigns an ID (the above information 110i) to a command. Here, the ID is information indicating what number access request the selected access request is and indicating a number of the selected access request, and is assigned to the command received in the number.

In Step S201, the command order determining unit 131 makes a determination on one of read commands issued by the read command buffer 120 and one of write commands issued by the write command buffer 121.

In other words, there is a state where both the write commands and the read commands can be issued. This is the state where the read command buffer 120 has one or more read commands and the write command buffer 121 has one or more write commands. The above determination tells whether or not such a state is observed. In the case where the determination result shows that the state is observed (S201: YES), the processing proceeds to Step S202. In contrast, in the case where the determination result that either the write commands or the read commands can be issued, (S201: NO), the processing proceeds to Step S204.

In Step S202, the command order determining unit 131 receives an identifier from the write data reception completion notification control unit 130. When receiving the identifier, the command order determining unit 131 determines whether or not there is a valid write command in the write command buffer 121. In other words, in the case where the received identifier shows that storing of the data of a write command has completed (S202: YES), the write command is determined as valid. In the case where the received identifier shows that storing of the data of the write command has not completed (S202: NO), the write command is determined as invalid.

In the case where the determination result shows that there is a valid write command (S202: YES), the processing proceeds to Step S203.

In the case where the determination result shows there is no valid write command (S202: NO), the processing proceeds to Step S207. The command order determining unit 131 selects a read command having the ID with the lowest number from among the read commands in the read command buffer 120.

In Step S203, based on the identifier provided from the write data reception completion notification control unit 130 and determining that the write data has bee stored, the command order determining unit 131 compares the IDs of the read commands and the ID of the write command, and selects one of the commands having the ID with the lowest number.

In the case where the write command is selected (S203: YES), the processing proceeds to Step S206. In the case where the read command is selected (S203: NO), the processing proceeds to Step S207.

In contrast, Step S204 involves processing to be executed in the case where (i) the determination result is NO in S201, (ii) only either the write commands or the read commands are found, and (iii) only the found commands can be issued. In the processing in Step S204, in the case where the found commands are the read commands (Step S204: YES), the processing proceeds to Step S208 and the command order determining unit 131 selects the read commands. In contrast, in the case where the found commands are the write commands (Step S204: NO), the processing proceeds to Step S205.

In Step S205, the command order determining unit 131 receives the above-described identifier from the write data reception completion notification control unit 130, and determines whether or not there is a valid write command (see the processing in S202).

In the case where the determination result shows that there is a valid write command (S205: YES), the processing proceeds to Step S209 and the command order determining unit 131 selects the write command. In the case where the determination result shows there is no valid command (S205: NO), the command order determining unit 131 does not select any of the commands.

FIG. 3A shows a specific example of the processing illustrated in FIGS. 1 and 2.

A field 500 chronologically shows commands selected by the master arbitrating unit 110. The master arbitrating unit 110 selects one of the bus masters 102.

A field 501 chronologically shows a state of read commands each having an ID and stored in the read command buffer 120.

A field 502 chronologically shows a state of write commands each having an ID and stored in the write command buffer 121.

A field 503 chronologically shows commands to be selected and issued to the memory device 150 by the command order determining unit 131.

In the specific example, detailed explanations will be given only for the processing at each time where a relatively characteristic point is observed.

It is noted that a command is indicated with attribute, ID number, and data flag.

Here, the "attribute" includes R (read command) and W (write command).

The "ID number" indicates what number command a command is.

The "data flag" includes 0 (write data not stored) and 1 (write data stored).

It is noted that the data flag indicates whether or not the write data has stored, and relates only to write commands. Hence, the data flag is not shown for read commands. The read commands simply have attributes and ID numbers.

At the time t1 in FIG. 3A, a read command with ID (R1) alone is stored in the read command buffer 120. Hence, the read command with ID (R1) is selected by the command order determining unit 131 (for example, see S201: NO, S204: YES, and S208 in FIG. 2).

As shown in FIG. 3A, a command (the read command with ID or R1) to be selected by the access control unit 140 at a time (the time t1, for example) is illustrated at a point designated to the time in the field 503.

It is nodded that, in FIG. 3A, the table at the time t1 in the field 501 includes in the fourth row the above-described read command with the ID (R1). The second and third rows in the table are blanks. In other words, the read command buffer 120 stores the read command with the ID (R1) alone.

In FIG. 3A, the table at the time t1 in the field 502 has blanks in all the rows. In other words, this shows that the write command buffer 121 stores no write command.

At the time t3, the read command buffer 120 stores a read command with ID (R3), and the write command buffer 121 stores a write command with ID (W2, 0). The latter write command with ID (W2, 0) has a data flag of 0 (see the column of flag (second column) in the fourth row of the table in the field 502). In other words, the flag shows that the write data of the write command with ID (W2, 0) has not stored yet. Hence, another command—that is a read command with ID (R3)—is selected (see S201: YES, and S202: NO, and S207).

At the time t5, a read command with an ID (R5) is stored in the read command buffer 120. In addition, two write commands with ID ((W2, 1) and (W4, 0)) are stored in the write command buffer 121.

Of the two write commands with ID ((W2, 1) and (W4, 0)), the former write command with ID (W2, 1) has a data flag (a flag 9Fm in FIG. 3C) of "1" which shows that storing of the data is complete (see the numerical sign "1" in the fourth row in the second column in the table at time t5 in the field 502). The write command with ID (W2, 1) has an ID (an ID of 9Nw in FIG. 3C) of "2". The ID "2" comes before an ID (an ID of 9Nr in FIG. 3B) of "5" (the fourth row in the table in the field 501 at the time t5) for the read command with the ID (R5). Hence, selected here is the write command with the ID (W2, 1) (for example, see S201: YES, S202: YES, S203; YES, and S206).

At the time t7, the read command with ID (R5) is stored in the read command buffer 120. In addition, two write commands with ID ((W4, 1) and (W6, 0)) are stored in the write command buffer 121. Hence, similar to the case of the time t5, selected at the time t7 is the write command with ID (W4, 1) in the fourth row of the table in the field 502.

At the time t9, the read command buffer 120 stores the read command with ID (R5), and the write command buffer 121 stores a write command with ID (W6, 1). The former read command with ID (R5) has an ID of "5" and comes before the ID of "6" for the latter read command with ID (W6, 1). Hence, selected is the former read command with ID (R5) (for example, see S201: YES, S202: YES, S203: NO, and S207).

As described above, the command order determining unit 131 selects a command based on the information (see the above IDs) used by the master arbitrating unit 110 for selecting one of the bus masters 102. Such features make it possible to minimize the mix-up of an order selected by the master arbitrating unit 110. In other words, the features can organize the order to issue commands to the memory device 150 in a relatively appropriate order, based on an order of commands selected by the master arbitrating unit 110.

In addition, there would be some non-issuable write commands. With a non-issuable write command, for example, write data corresponding to the non-issuable write command is being transmitted to the data buffer 122. The write command cannot be issued until the storing of the write data is complete. In such a case, a read command is selected (see S202: NO and S207). Such features make it possible to execute an access to the memory device 150 with the selected read command, and contribute to preventing the deterioration of access quality to the memory device 150. For example, the features make it possible to hide overhead.

It is noted that any devices, such as a SDRAM which transmits data with an address and an access attribute, can be used as the memory device 150. Those devices may be provided either in or out of an LSI in which the data processing device 100 is included.

In the case of YES in S201 in FIG. 2, one or more write commands are stored in the write command buffer 121.

In some cases, for example, only one write command may be stored (for example, see the times t2, t3, t8, and t9 in FIG. 3A).

In S202, a determination may be made to find out whether or not the command order determining unit 131 has obtained the information 130i that indicates the completion of the storing of the write data for the one write command.

In the case where the determination result shows that the information 130i has been obtained (S202: YES), the process of S203 may be executed. In the case where the determination result shows that the information 130i has not been obtained (S202: NO), the process of S207 may be executed.

In contrast, two or more write commands may be stored.

In S202, a determination may be made to find out whether or not the two or more write commands include the write command with which the information 130i, indicating the completion of the storing described above, has been obtained.

In S203, a determination may be made to find out whether or not one or more write commands with the information 130i assigned include a write command whose ID comes before an ID of a read command stored in the read command buffer 120.

In S203, in the case where the determination result shows that one or more write commands whose IDs come before the ID of the read command (S203: YES), one of such write commands may be issued to the memory device 150 (S206). Moreover, in the case where the determination result shows that there is no write command whose ID comes before the ID of the read command (S203: NO), the read command may be issued (S207).

More specifically, in some cases, two or more read commands may be stored in the read command buffer 120.

In S203, the processing may be executed on the read command whose ID indicates the earlier command to come of the two or more read commands. In other words, a determination may be made to find out whether or not one or more write commands for which the information 130i is obtained include a write command whose ID indicates that the write command comes before the read command whose ID indicates the earliest command to come.

In the case where the determination result shows that no such write command is included (S203: NO), issued may be the read command whose ID indicates the earliest command to come (S207).

Embodiment 2

As described in Embodiment 1, FIG. 1 shows that each of the bus masters 102 issues a read access request and a write access request to the master arbitrating unit 110 in the data processing device 100.

When an access request is the write access request, one of the bus masters selected by the master arbitrating unit 110 (the above-described bus master 102s) issues a write command to the master arbitrating unit 110.

As soon as issuing the write command, the selected bus master 102 issues, to the data buffer 122, write data to the write command.

In contrast, when the access request is the read access request, the one selected bus master 102 issues a read command to the master arbitrating unit 110.

In Embodiment 2, the master arbitrating unit 110 assigns a remaining time degree to each of the bus masters 102. Each of the bus masters 102 has to complete data transmission to the memory device 150 by a specific time. Each of the remaining time degrees indicates how much time left until the specific time for the bus masters 102.

Once each of the bus masters 102 sends an access request to the master arbitrating unit 110, the remaining time degree for the bus masters 102 is decremented. At the time when one of the bus masters 102 is to be selected, the master arbitrating unit 110 selects a bus master 102 having the smallest remaining time degree.

The master arbitrating unit 110 assigns the remaining time degree to a command issued by the selected bus master 102 to execute the access request. Here, the remaining time degree is obtained at the time when the access request (bus master) is selected.

In the case where the command with the remaining time degree is a read command for a read access, the master arbitrating unit 110 issues the read command to the read command buffer 120. In contrast, in the case where the command with the remaining time degree is a write command for a write access, the master arbitrating unit 110 issues the write command to the write command buffer 121.

The read command buffer 120 holds the read command issued by the master arbitrating unit 110, and issues the read command to the command order determining unit 131. It is noted that the remaining time degree assigned to the read command is decremented while the read command buffer 120 is holding the read command.

The write command buffer 121 holds the write command issued by the master arbitrating unit 110, and issues a write command access request to the command order determining unit 131. It is noted that the remaining time degree assigned to the write command is decremented while the write command buffer 121 is holding the write command.

The write data reception completion notification control unit 130 checks the state of the write command buffer 121. Specifically, the write data reception completion notification control unit 130 checks whether or not the write data corresponding to the write command is stored in the data buffer 122. When the storing of the write data is complete, the write data reception completion notification control unit 130 issues, to the command order determining unit 131, an identifier which identifies the completion of the storing of the write data.

The command order determining unit 131 selects either the read command to be issued by the read command buffer 120 or the write command to be issued by the write command buffer 121. In selecting, the command order determining unit 131 executes the processing below.

The command order determining unit 131 selects a command using one or more read commands with remaining time degrees and stored in the read command buffer 120, one or more write commands with remaining time degrees and stored in the write command buffer 121, and one or more signals described below. Each of the one or more commands is an identifier (data storing completion signal) provided from the write data reception completion notification control unit 130.

The above-described one or more write commands with remaining time degrees includes at least one write command with a remaining time degree for which a data storing completion signal corresponding thereto is provided from the write data reception completion notification control unit 130. The at least one write command with a remaining time degree for which a data storing completion signal is provided is a valid command. The data storing completion signal indicates that write data corresponding to the at least one write command with a remaining time degree has already been obtained.

The command order determining unit 131 selects a command having the smallest remaining time degree from among the one or more read commands with remaining time degree and the one or more write commands whose data storing completion signals are valid.

In the case where the read command is selected, the command order determining unit 131 issues a read command to the access control unit 140. Upon issuing the read command, the access control unit 140 issues a read command to the memory device 150 and requests the transmission of read data.

In the case where a selected command is the write command, the command order determining unit 131 issues a write command to the access control unit 140. Upon receiving the write command, the access control unit 140 extracts the write data from the data buffer 122. The access control unit 140 issues a write command to the memory device 150, and causes the memory device 150 to transmit the issued write data.

Figure 4:
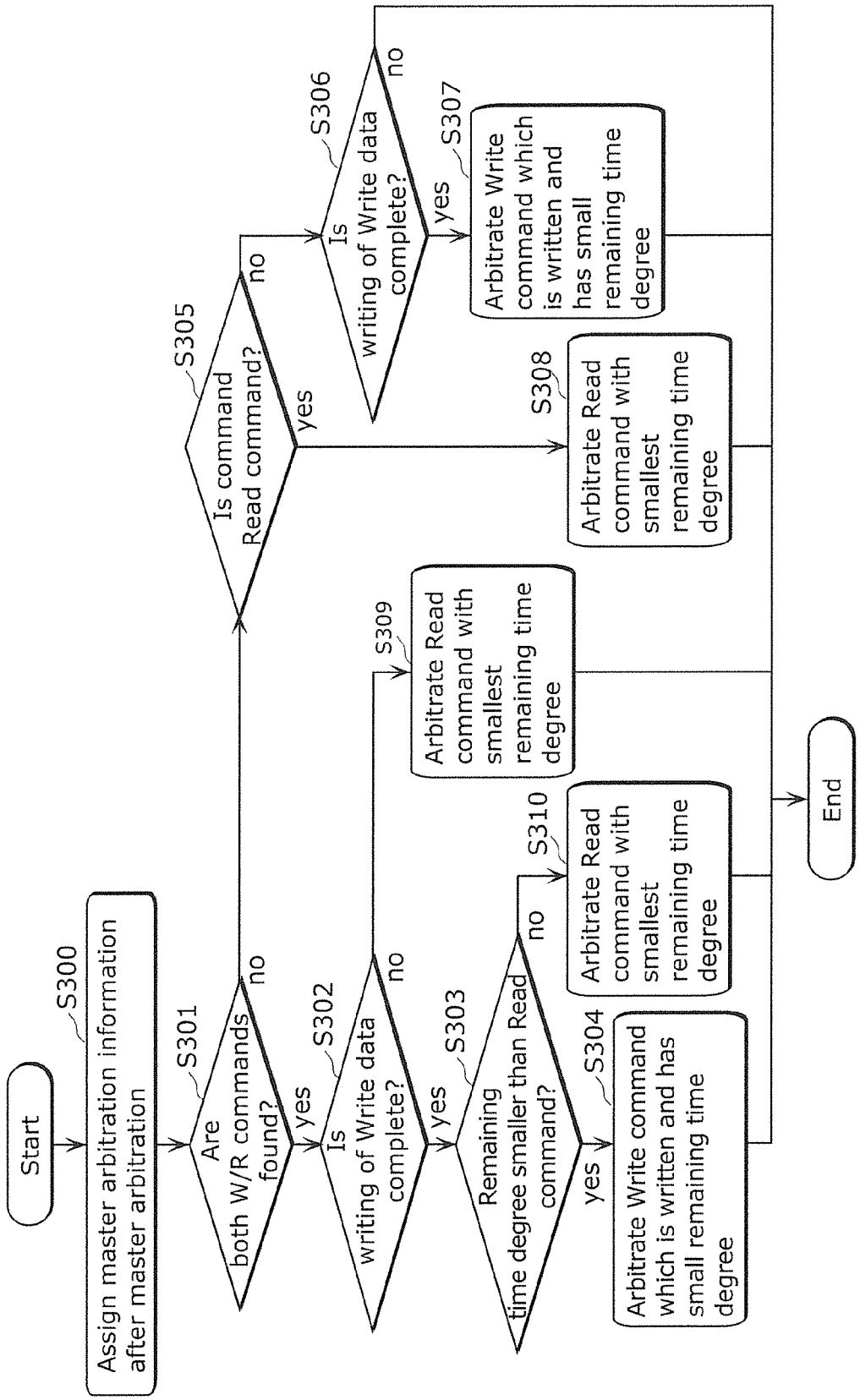
FIG. 4 is depicts a flowchart showing operations in Embodiment 2.

FIG. 4 depicts a flow of processing executed by the data processing device 100 in FIG. 1.

In Step S300, the master arbitrating unit 110 selects one of the access requests issued by the multiple bus masters 102, and receives a command for the selected access request (the bus master 102). The master arbitrating unit 110 then assigns a remaining time degree to the command issued by the bus masters 102 to the master arbitrating unit 110. Here, the remaining time degree is obtained at the time when the access request is selected.

In Step S301, the command order determining unit 131 arrives at a determination on read commands issued by the read command buffer 120 and writes commands issued by the write command buffer 121.

In the case where both the write commands and the read commands can be issued (S301: YES), the processing proceeds to Step S302. In the case where either the write commands or the read commands can be issued, (S301: NO), the processing proceeds to Step S305.

In Step S302, the command order determining unit 131 receives an identifier from the write data reception completion notification control unit 130. The identifier notifies whether or not the write data corresponding to the write command is stored in the data buffer 122. Upon receiving the identifier, the command order determining unit 131 determines that the write data corresponding to the write command is stored and valid.

In the case where the determination result shows that there is a valid write command (S302: YES), the processing proceeds to Step S303. In the case where the determination result shows there is no valid write command (S302: NO), the processing proceeds to Step S309. The command order determining unit 131 selects a read command having the smallest remaining time degree from among the read commands in the read command buffer 120.

In Step S303, the command order determining unit 131 executes processing on the write command whose write data is indicated as stored, based on the identifier from the write data reception completion notification control unit 130. In other words, the command order determining unit 131 compares the remaining time degree assigned to such a write command and the remaining time degree assigned to the read command.

In the case where there is a write command whose remaining time degree is lower than the remaining time degree of the read command (S303: YES), the command order determining unit 131 selects in Step S304 a write command whose remaining time degree is lowest at the time.

In contrast, in the case where there is an access request to a read command whose remaining time degree is smaller than the remaining time degree of the write command (S303: NO), the command order determining unit 131 selects in Step S310 a write command whose remaining time degree is smallest at the time.

It is noted that the techniques for selecting a write command or a read command in Steps S303, S304, and S310 include, for example, a technique to select a valid write command from the write command buffer 121 and the command having the smallest remaining time degree from among read commands.

In Step S305, in the case where the found commands are the read commands only (S305: YES), the processing proceeds to Step S308 and the command order determining unit 131 selects a read command having the smallest remaining time degree. In the case where the command access request is directed only to a write command (S305: NO), the processing proceeds to Step S306.

In Step S306, the command order determining unit 131 receives the identifier from the write data reception completion notification control unit 130, and determines whether or not there is a valid write command. Here, the identifier notifies whether or not the write data corresponding to the write command is stored in the data buffer 122. In the case where there is a valid write command (S306: YES), the processing proceeds to Step S307 and the command order determining unit 131 selects, from among the write commands in the write command buffer 121, a write command having the smallest remaining time degree at the time. In the case where the determination result shows there is no valid command (S306: NO), the command order determining unit 131 does not select any of the commands.

Figure 5A:
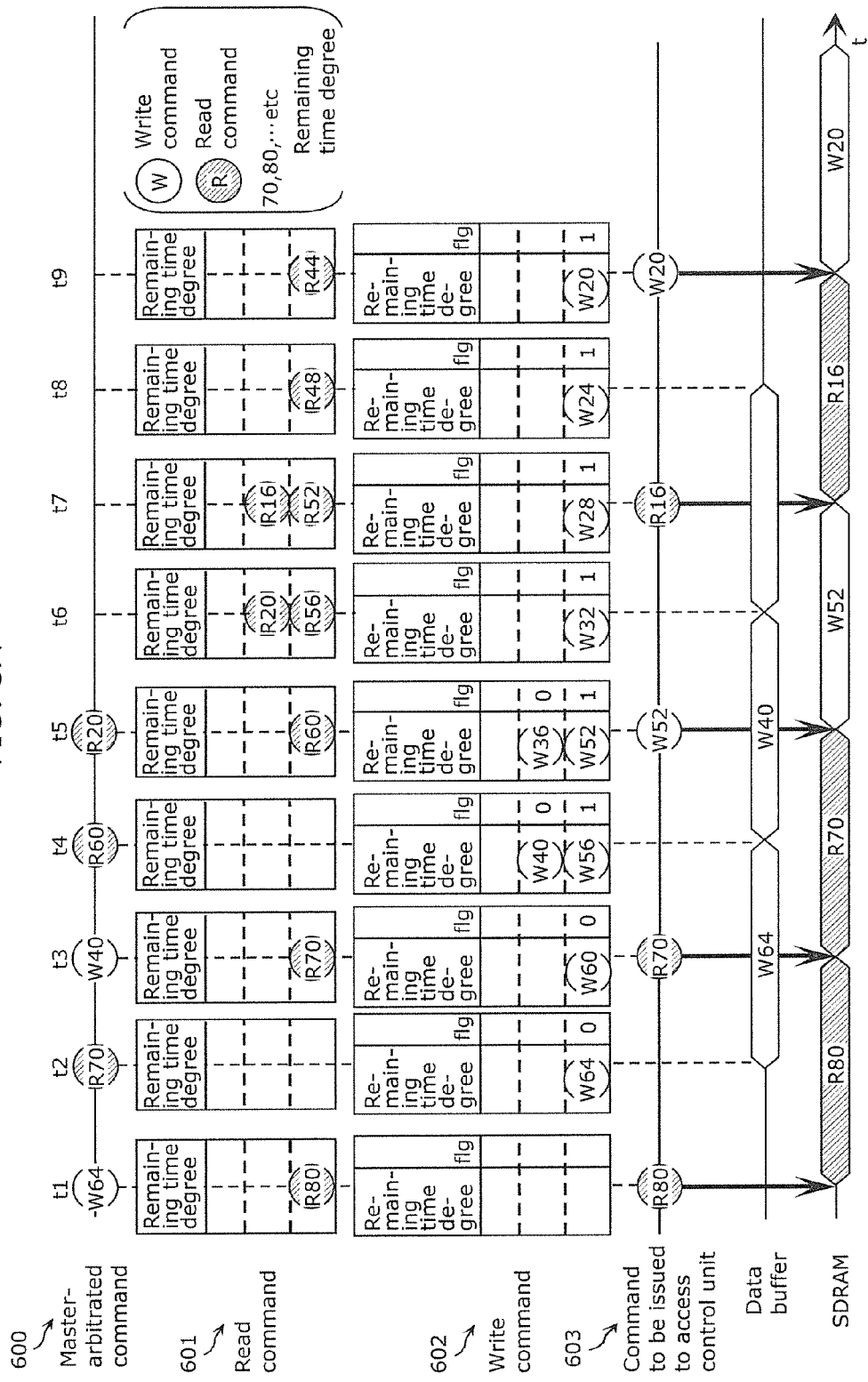
FIG. 5A depicts a chart showing how commands are selected in Embodiment 2.

FIG. 5A shows a specific example of the processing illustrated in FIGS. 1 and 4.

A field 600 chronologically shows commands selected by the master arbitrating unit 110. The master arbitrating unit 110 selects one of the bus masters 102.

A field 601 chronologically shows a state of read commands each having a remaining time degree and stored in the read command buffer 120.

A field 602 chronologically shows a state of write commands each having a remaining time degree and stored in the write command buffer 121.

A field 603 chronologically shows commands to be selected and issued to the memory device 150 by the command order determining unit 131.

In the specific example, detailed explanations will be given only for the processing executed at a relatively characteristic time.

A command is indicated with attribute, remaining time degree, and data flag.

Here, the "attribute" includes R (read command) and W (write command).

The "remaining time degree" is a number.

The "data flag" includes a 0 (write data not stored) and a 1 (write data stored).

At the time t1, a read command with remaining time degree (R, 80) alone is stored in the read command buffer 120 (see the tables in the fields 601 and 602 at the time t1).

Hence, the read command with remaining time degree (R, 80) is selected by the command order determining unit 131.

At the time t3, the read command buffer 120 stores a read command with remaining time degree (R, 70) and the write command buffer 121 stores a write command with remaining time degree (W, 60, 0).

Hence, the read command with remaining time degree (R, 70) is selected.

At the time t5, the read command buffer 120 stores a read command with remaining time degree (R, 60) and the write command buffer 121 stores write commands with remaining time degree ((W, 52, 1) and (W, 36, 0)).

Figure 5B:
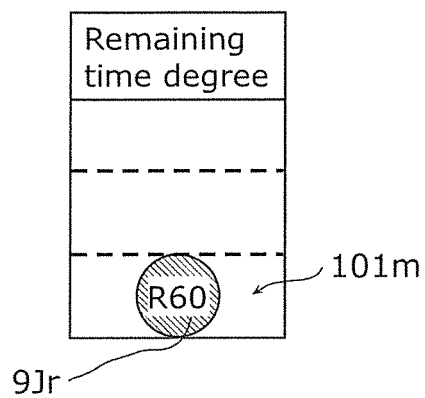
FIG. 5B shows a state of a read command having a remaining time degree and stored in a read command buffer.
Figure 5C:
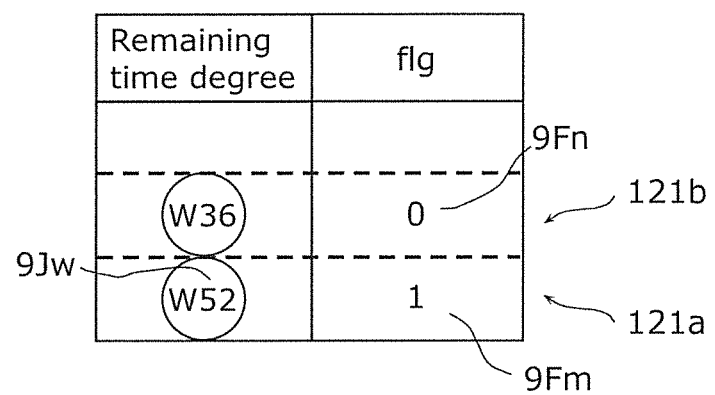
FIG. 5C shows a state of a write command having a remaining time degree and stored in a write command buffer.
Figure 6:
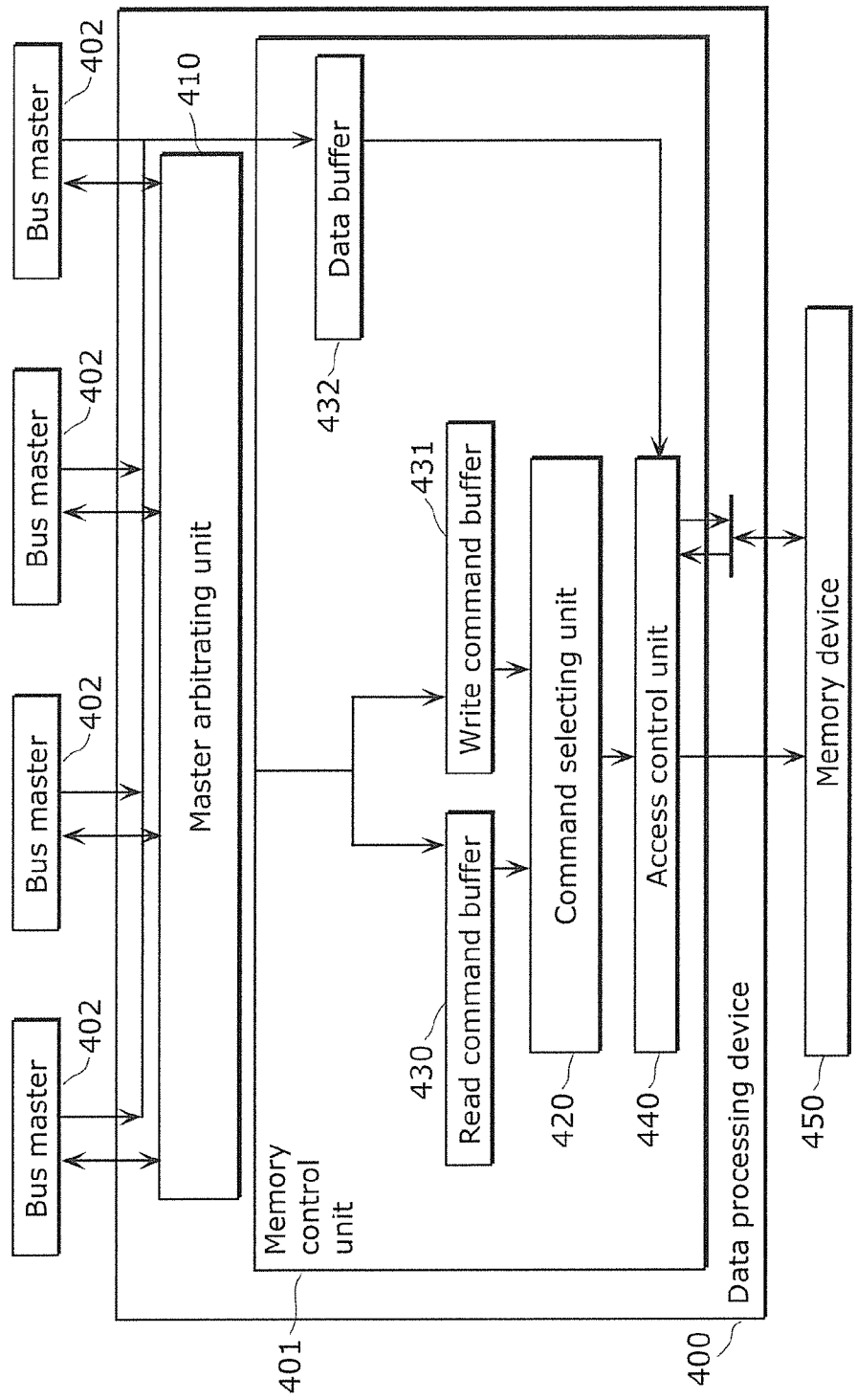
FIG. 6 is a data processing device implemented with a conventional technique.
Figure 7:
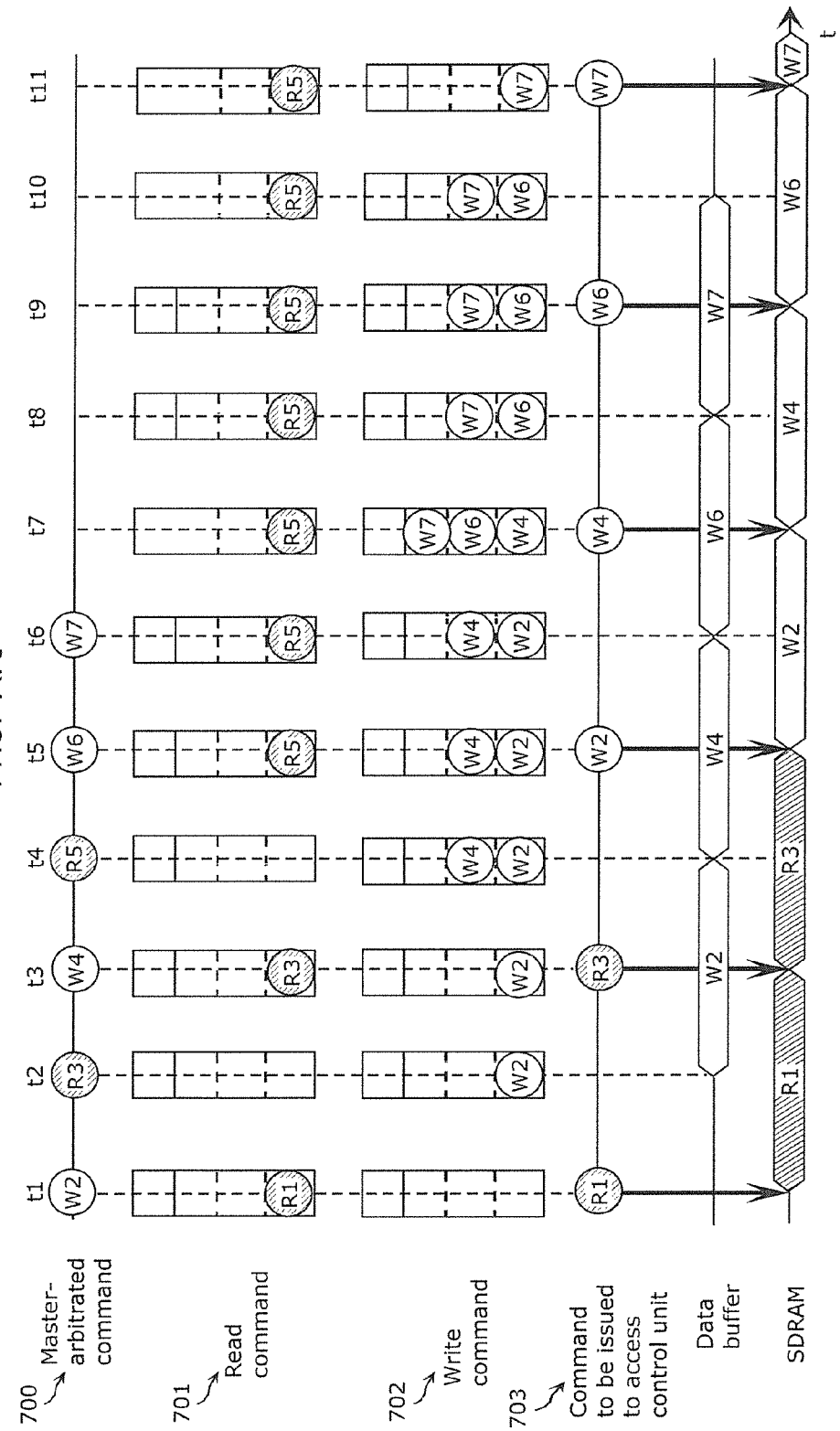
FIG. 7 depicts an exemplary chart showing how commands are selected with a conventional technique.

Hence, the write command with remaining time degree (W, 52, 1) is selected (see the remaining time degree 9Jr for the read command with remaining time degree (R, 60) in FIG. 5B and the remaining time degree 9Jw for the write command with remaining time degree (W, 52, 1) in FIG. 5C).

At the time t7, the read command buffer 120 stores read commands with remaining time degree ((R, 16) and (R, 52)) and the write command buffer 121 stores a write command with remaining time degree (W, 28, 1).

Hence, the read command with remaining time degree (R, 16) is selected.

As described above, the command order determining unit 131 selects a command based on the information used by the master arbitrating unit 110 for selecting one of the bus masters 102. In other words, for each time the command order determining unit 131 selects a command, the result of the selection by the master arbitrating unit 110 can be reflected. This makes it possible to issue a command to the memory device 150 more appropriately.

In addition, in the case where a non-issuable write command is found while a write data is being transmitted to the data buffer 122 (for example, see the write command with remaining time degree (W, 60, 0) at the time t3 in FIG. 5A), a read command (the read command with remaining time degree (R, 70) at the time t3) can be selected. Such features contribute to preventing the deterioration of access quality to the memory device 150 and hiding overhead.

Any devices, such as a SDRAM which transmits data with an address and an access attribute, can be used as the memory device 150. Those devices may be provided either in or out of an LSI in which the data processing device 100 is included.

In the case where there are two commands both having the same remaining time degree when an ID, indicating what number access request a selected access request is, is further assigned to a command and the command order determining unit 131 selects the command, the command order determining unit 131 may select a command having a lower number of ID.

Hence, the problems described below will be solved. When a command selecting unit (the command order determining unit 131) selects commands in the order that the master arbitrating unit 110 has selected the commands (see (i) in Technical Problems), the problems below occur. In the case where no write data is stored in the data buffer 122 when a write command is selected, the command selecting unit cannot access the access control unit 140. Consequently, this causes overhead. In order to avoid the problem, the command selecting unit could select commands from among master-arbitrated write commands and read commands based on fixed-priority processing (write-priority processing), and issue the selected commands to the access control unit 140 (see (ii) in Technical Problems). However, in the case where the command selecting units selects commands from among the write commands and the read commands regardless of the selection order made with master arbitration, and issues the selected commands to the access control unit 140, the following case could occur: For example, a read command could not be selected and would be continuously overtaken by the following write commands. This would significantly mix up the order that the master arbitrating unit 110 selects. Hence, as described above, when the master arbitrating unit 110 makes the selection, information on the selection is assigned to a command. Using the information and other information indicating that storing the data storing completion signals for the write data is complete, the command order determining unit 131 determines a command and selects an access request to the command.

It is noted that the operations below may be executed in some cases.

In other words, as described above, the techniques employed by the data processing device 100 according to an implementation of the present disclosure can minimize the mix-up of an order selected by the master arbitrating unit 110, and allows a read command to overtake a write command which waits for write data and cannot be issued.

For example, such effects may be made by the operations below.

In other words, the order that shall be kept and not be mixed up as much as possible may be identified based on the information 110$i$ (FIG. 1).

The information 110$i$ is generated by the master arbitrating unit 110. Specifically, the information 110$i$ includes the above-described ID and remaining time degree.

The generated information 110$i$ may be assigned to a command based on the issuing order included in the information 110$i$. When assigned, the information 110$i$ may be included and part of the command.

In contrast, a command (see the command 110$c$ in FIG. 1) may be either a read command (see the read command 110$r$) or a write command (see the write command 110$w$).

The read command may be stored in the read command buffer 120, and the write command may be stored in the write command buffer 121.

Based on the write command, the information 130$i$ may be generated. Here, the information 130$i$ indicates completion of the storing of the write data (the data 122$d$ in FIG. 1), which is written to the memory device 150, into the data buffer 122.

The write command may be issued to the memory device 150 only after the information 130$i$ is generated. The write command does not have to be issued before the generation of the information 130$i$.

That the write command may be issued means that the write command is issued appropriately.

Figure 3C:
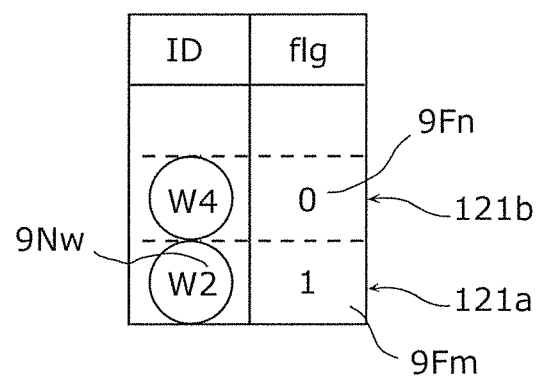
FIG. 3C shows a state of a write command having an ID and stored in a write command buffer.

The write command may include two write commands (the commands 121$a$ and 121$b$ in FIGS. 3A and 3C).

In other words, for one of the write commands (the command 121$a$), storing of the write data of the write command may be complete and a determination may be made to show that the information 130$i$ is generated to indicate the completion.

For the other one of the write commands (the command 121$b$), storing of the write data does not have to be complete and a determination may be made to show that the information 130$i$, which indicates the completion, has not been generated.

Hence, the command order determining unit 131 does not have to select one of the commands (the command 121$b$) to which the determination is made to show that the storing is not complete. Instead, the command order determining unit 131 may select the other command only.

In other words, one of the commands to be selected may be a first command (the command 121$a$) to which the determination is made to show the completion of the storing and a second command (the command 101$m$) which is a read command.

In the case where the number of the first command comes before the number of the second command based on the information 110$i$ assigned to the first command and the information 110$i$ assigned to the second command, the processing below may be executed.

In the processing, the first command (the command 121$a$) may be selected before the second command (the command 101$m$) by the command order determining unit 131 so that the first command executes an access to the memory device 150.

In contrast, in the case where that the number of the first command does not come before the number of the second command based on the information 110$i$ assigned to the first command and the information 110$i$ assigned to the second command, the processing below may be executed.

In other words, in the processing, the second command (the command 101$m$) may be selected by the command order determining unit 131.

Hence, according to each of the information items 110$i$ generated by the master arbitrating unit 110, one of the first command and the second command is selected. This minimizes the mix-up of the issuing order of the commands selected by the master arbitrating unit 110.

Furthermore, a case below is observed when the information 110$i$ identifies that the first command does not come before the second command; instead, the second command comes before the first command.

In other words, the second command (the command 101$m$) is selected before the other command (the command 121$b$) whose write data has not stored yet. Hence, a read command (the command 101$m$) can overtake a write command (the command 121$b$) which waits for the write data and cannot be issued.

Such a feature makes it possible to minimize the mix-up of the order selected by the master arbitrating unit 110 and allows the read command (the command 101$m$) to overtake the write command (the command 121$b$) that waits for the write data and cannot be issued.

Thanks to the above points, the techniques according to an implementation of the present disclosure differ from conventional techniques.

It is noted that the present disclosure can be implemented not only as a device and an integrated circuit but also as a method utilizing the characteristic units of the device in the form of steps and as a program to cause a computer to execute the characteristic steps. As a matter of course, the program may be distributed via a recording medium such as a CD-ROM and a transmission medium such as the Internet.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for implementing a data processing device according to each of the embodiments is a program described below.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

As described above, a data processing device according to an implementation of the present disclosure is suitable as a system LSI which uses a device for controlling transmission of data to a memory device shared by multiple bus masters.

The invention claimed is:

1. A data processing device which controls transmission of data from bus masters to a memory device, the data processing device comprising:
    a master arbitrating unit configured generate a command with additional information assigned, the master arbitrating unit selecting one of the bus masters, and the additional information being assigned to a command sent from the one selected bus master;
    a data buffer which stores write data of a write command in a case where the command with the additional information is the write command;
    a write command buffer which stores the write command in a case where the command with the additional information is the write command;
    a read command buffer which stores a read command in a case where the command with the additional information is the read command;
    a signal issuing unit configured to issue a signal which indicates that storing of the write data is complete; and
    a command order determining unit configured to select one of a first command and a second command as a command to be issued to the memory device, the first command being the write command stored in the write command buffer and for which the issued signal indicates that the storing of the write data is complete, the second command being the read command stored in the read command buffer, and the command to be issued being whichever of the first command and the second command comes earlier in an order identified with the additional information assigned.

2. The data processing device according to claim 1, wherein the additional information to be assigned is an ID indicating that an access request to the memory device is what number access request selected by the master arbitrating unit, the access request being made by the command to which the additional information is assigned, and
    the command order determining unit is configured to select one of the first command and the second command having an ID with a smaller number.

3. The data processing device according to claim 1, wherein the additional information to be assigned is a remaining time degree for a processing time period spent for an access to the memory device with the command sent from the one bus master selected by the master arbitrating unit,
    after storing the write command, the write command buffer decrements a remaining time degree of the stored write command,
    after storing the read command, the read command buffer decrements a remaining time degree of the stored read command, and
    the command order determining unit is configured to select one of the first command and the second command having a lower remaining time degree of the remaining time degrees at a time of the selection.

4. The data processing device according to claim 3, wherein the master arbitrating unit is further configured to assign, to the command as the additional information, first additional information which is the remaining time degree and second additional information which is an ID indicating that an access request made by the command is what number access request selected by the master arbitrating unit, and
    in a case where the first command and the second command are equal in the remaining time degree, the command order determining unit is configured to select one of the first command and the second command having an ID with a smaller number.

5. The data processing device according to claim 3, wherein the master arbitrating unit is configured to assign a remaining time degree to each of the bus masters, decrement the remaining time degree when the bus master makes an access request, and select one of the bus masters having a lowest remaining time degree of the assigned remaining time degrees at a time of the selection, the remaining time degree indicating how much time left until the access to the memory device has to be made.

6. A data processing method for controlling transmission of data from bus masters to a memory device, the data processing method comprising:
    generating a command with additional information assigned, by selecting one of the bus masters and assigning the additional information to a command sent from the one selected bus master;
    storing write data of a write command in a data buffer in a case where the command with the additional information is the write command;
    storing the write command in a write command buffer in a case where the command with the additional information is the write command;
    storing a read command in a read command buffer a case where the command with the additional information is the read command;
    issuing a signal which indicates that storing of the write data is complete; and
    selecting one of a first command and a second command as a command to be issued to the memory device, the first command being the write command stored in the write command buffer and for which the issued signal indicates that the storing of the write data is complete, the second command being the read command stored in the read command buffer, and the command to be issued being whichever of the first command and the second command comes earlier in an order identified with the additional information assigned.

7. A data processing method for controlling transmission of data from bus masters to a memory device, the data processing method comprising:

selecting one of the bus masters and assigning an ID to a command sent from the one selected bus master, the ID indicating that what number command is the command when selected;

determining availability of data of a write command which is the command selected in the selecting, and identifying the write command in a case where the write command is available; and selecting one of a first command and a second command having an ID with a smaller number as a command to be issued to the memory device, the first command being the available write command identified in the determining and the second command being a read command.

8. A data processing method for controlling transmission of data from bus masters to a memory device, the data processing method comprising:

selecting one of the bus masters and assigning a remaining time degree to a command sent from the one selected bus master, the remaining time degree indicating how much time is left until an access to the memory device is to be finished;

determining availability of data of a write command which is the command selected in the selecting, and identifying the write command in a case where the write command is available; and selecting one of a first command and a second command having a lower remaining time degree as a command to be issued to the memory device, the first command being the available write command identified in the determining and the second command being a read command.

* * * * *